US007341543B2

(12) United States Patent
Dandy

(10) Patent No.: US 7,341,543 B2
(45) Date of Patent: Mar. 11, 2008

(54) APPARATUS FOR SHIFTING WEIGHT FROM A RUNNER TO A WHEELED FRAME

(75) Inventor: Walter Dandy, PMB 160, 2121 N. Frontage Rd., Vail, CO (US) 81657

(73) Assignee: Walter Dandy, Vail, CO (US)

( * ) Notice: Subject to any disclaimer, the term of this patent is extended or adjusted under 35 U.S.C. 154(b) by 515 days.

(21) Appl. No.: 10/686,802

(22) Filed: Oct. 17, 2003

(65) Prior Publication Data

US 2005/0085349 A1 Apr. 21, 2005

(51) Int. Cl.
*A63B 22/20* (2006.01)
*B62K 21/10* (2006.01)
*B62K 21/08* (2006.01)

(52) U.S. Cl. ............................ 482/68; 482/51; 482/69; 482/74; 482/78; 280/271

(58) Field of Classification Search .................. 482/51, 482/54, 66–69, 74, 78; 280/271, 290, 87.051; 472/15
See application file for complete search history.

(56) References Cited

U.S. PATENT DOCUMENTS 4,375,294 A * 3/1983 Beauchamp ........... 280/87.021
4,619,462 A * 10/1986 Shaffer et al. ........... 280/242.1
4,813,664 A * 3/1989 Vroulis ........................ 482/68
5,176,597 A * 1/1993 Bryne ......................... 482/74
5,314,202 A * 5/1994 Wilkins, Jr. ................. 280/511
5,732,964 A * 3/1998 Durham et al. ............. 280/266
6,471,229 B2 * 10/2002 Stewart ...................... 280/272
6,554,747 B1 * 4/2003 Rempe ........................ 482/38
6,578,594 B1 * 6/2003 Bowen et al. ................ 135/67
6,802,519 B2 * 10/2004 Morgan et al. ............. 280/272
7,001,313 B1 * 2/2006 Crnkovich ................... 482/68
2003/0228959 A1 * 12/2003 Perlstein ...................... 482/74
2004/0063550 A1 * 4/2004 Harris ......................... 482/69

FOREIGN PATENT DOCUMENTS

WO WO 8800850 A1 * 2/1988

* cited by examiner

*Primary Examiner*—Kevin C. Sirmons
*Assistant Examiner*—Victor K. Hwang

(57) ABSTRACT

An apparatus for shifting the body weight of a runner from a runner's legs to a wheeled frame for enhancing the runner's performance and minimizing leg strain comprises a loop of elastic rod-shaped material stretchable during standing and during running movement. A base bend of the elastic is secured to a pelvic harness at the top of the back of each leg, and another bend of the elastic is secured to the wheeled frame. A third bend is supported on pulleys mounted on a height adjustable tee on the wheeled frame. This brings about a significant shift of the runner's weight from the runner's legs to the wheeled frame.

17 Claims, 7 Drawing Sheets

Means for separating and connecting front and back halves of frame.

APPARATUS FOR SHIFTING WEIGHT FROM A RUNNER TO A WHEELED FRAME

U.S. Pat. No. 4,759,570 to the present inventor and U.S. Pat. No. 5,161,825 to the present inventor are incorporated herein by reference.

BACKGROUND OF THE INVENTION

1. Field of the Invention

The present invention relates to a performance enhancing assembly for runners or walkers. More specifically, the present invention relates to an assembly which shifts the upper body weight of a runner or walker from their legs to the frame of a rolling device as they walk, run, or stand.

2. Description of the Related Art

Running and walking have been very popular conditioning exercises for many years. These activities are enjoyed by virtually all age groups, and participation extends through the entire year and most of the globe. Due to the popularity of running and walking, a major world industry has developed for running and walking equipment. In recent years running equipment has advanced significantly to enhance running performance and safety. The runner/walker and manufacturers of relevant equipment are constantly looking for innovations in equipment which will enhance the performance of runners and make the sport less stressful. Additionally, a lot of attention has been given to the need to extend the conditioning benefits of running to those who might otherwise find the activity too demanding and stressful.

Running and walking place significant and repeated strains on joints, tendons, muscles, and the cardiovascular system. While the physical benefits arise from these very phenomena, the intensity of stress puts continuing participation out of the reach of many. While great strides have been made in designing running shoes to absorb some of the shock, the problem remains. Consequently, many runners eventually develop degenerative joint disease of the knee, hip, ankle, or back. The ironic outcome of the vigorous pursuit of healthful exercise through running is that it may ultimately preclude the activity most basic and crucial to health and wellbeing: walking.

Accordingly, runners and walkers have need of a device which could enhance their performance and lessen the strain on their legs.

An analogous performance enhancement assembly is described in U.S. Pat. No. 4,759,570 to Walter Dandy III (inventor of the present invention) for the sport of skiing. It was issued on Jul. 26, 1988. In combination with enhancements covered under U.S. Pat. No. 5,161,825, etc, this device has succeeded in extending the skiing lives of many who would have been forced to give it up due to the inherent lower extremity requirements of that sport. The very success and breadth of application of the ski product would indicate the desirability of conferring similar benefits for running and walking.

SUMMARY OF THE INVENTION

Therefore, it is an object of the present invention to provide a system for enhancing the performance and reducing the stresses of a runner or walker.

The present invention transfers part of the weight of a runner/walker to a wheeled vehicle by elastic means. The device is adjustable with respect to height of user and strength of the delivered effect.

As a feature, the device self-steers.

The objects of the present invention are fulfilled by providing an apparatus for shifting the body weight of the runner/walker from the pelvis to the frame and wheels as he ambulates comprising: a spring assembly including a loop of elastic rod-shaped material variably stretched during ambulatory movement; a tee shaped support for two pulleys to support the top bend of the loop positioned above two hooks to secure the base bend of the loop; said tee slides through a tightenable channel to adjust strength of lift and to adjust fit to user; said elastic loop extending over said pulley on said tee and terminating at strap means disposable about the thigh or thighs of a runner's legs whereby said spring means supports a portion of the runner/walker's body weight as a runner/walker ambulates, thereby shifting that portion of body weight from the legs to the apparatus. Steering is variably and adjustably controlled by a magnet, a bungee, and a water-weight.

Further scope of applicability of the present invention will become apparent from the detailed description given hereinafter. However, it should be understood that the detailed description and specific examples, while indicating preferred embodiments of the inventions, are given by way of illustration only, since various changes and modifications within the spirit and scope of the invention will become apparent to those skilled in the art from this detailed description.

DETAILED DESCRIPTION OF THE INVENTION

Figure 1:
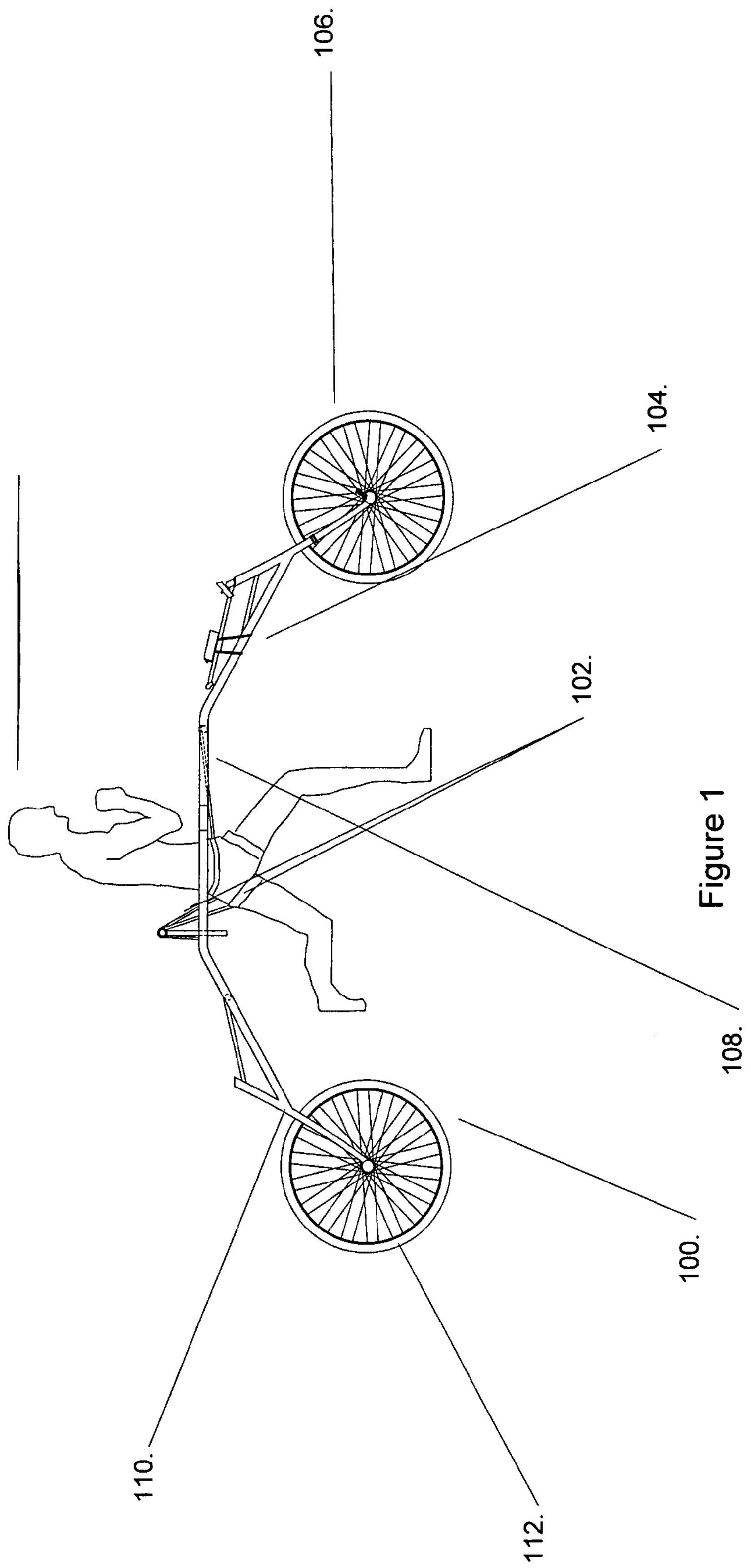
FIG. 1 is a perspective view of a runner utilizing the performance enhancement system of the present invention.

Referring to FIGS. 1-7, in FIG. 1 a runner is shown in position utilizing the device 100. The pelvic harness 102 comprises spring means 1 removably attached to the wheeled frame 104. Prior to describing a preferred embodiment of the invention, it is pointed out that the parts of the wheeled frame assembly may be made of any conventional materials capable of withstanding the rigors of bike riding. The preferred materials are metal, carbon fiber, fiberglass or the like.

The wheeled frame 104 in this embodiment consists of a conventional bicycle steering front end 106 connecting with an encircling frame 108 which encircles the runner and supports the tee 4 and terminates behind the runner in a welded connection to a bicycle fork 110which secures the trailing wheel 112.

Figure 2:
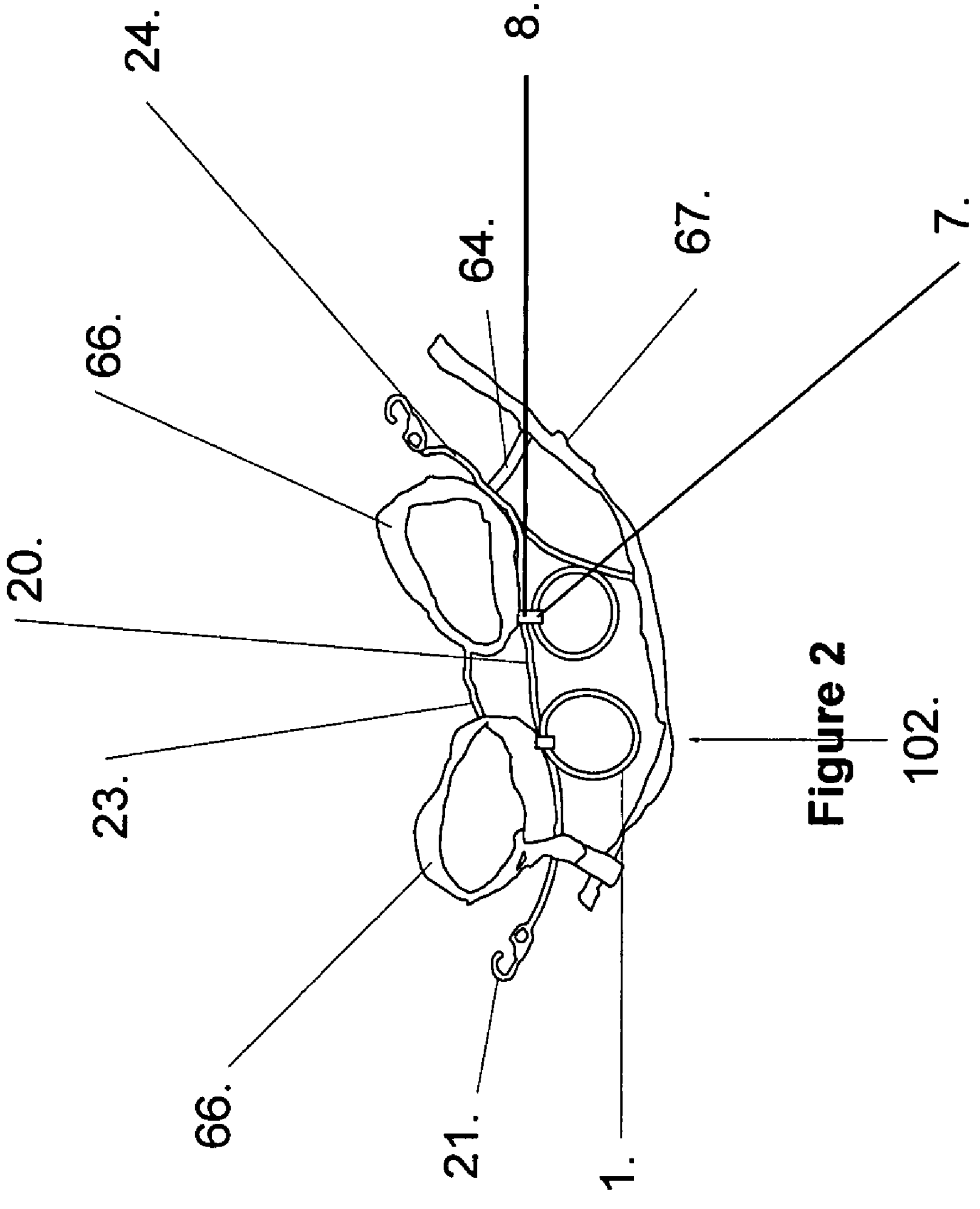
FIG. 2 shows the harness of FIG. 1, including the direct attachment of the elastic bands to the harness, and the integration of a bungee for centering of the user with respect to the wheeled frame.

FIG. 2 shows the harness 102 of FIG. 1 in more detailing, including the direct attachment of the elastic bands 1 to the harness 102, and the integration of a bungee 20 for centering of the user with respect to the wheeled frame 104.

A quick link 7 attaches each elastic loop 1 to the riveted triangular ring 8 on the harness 102 at the back of each of the runner's legs. A similar harness is shown in U.S. Pat. No. 5,161,825, FIG. 5 A, which shows a waist strap 67 connected to a pair of thigh straps 66 by vertical straps 64. Thigh straps 66 are connected by strap 23. A bungee cord 20 with hooks 21 at either end passes through the quick links 7. One hook end includes a length adjustment feature 24.

Figure 3:
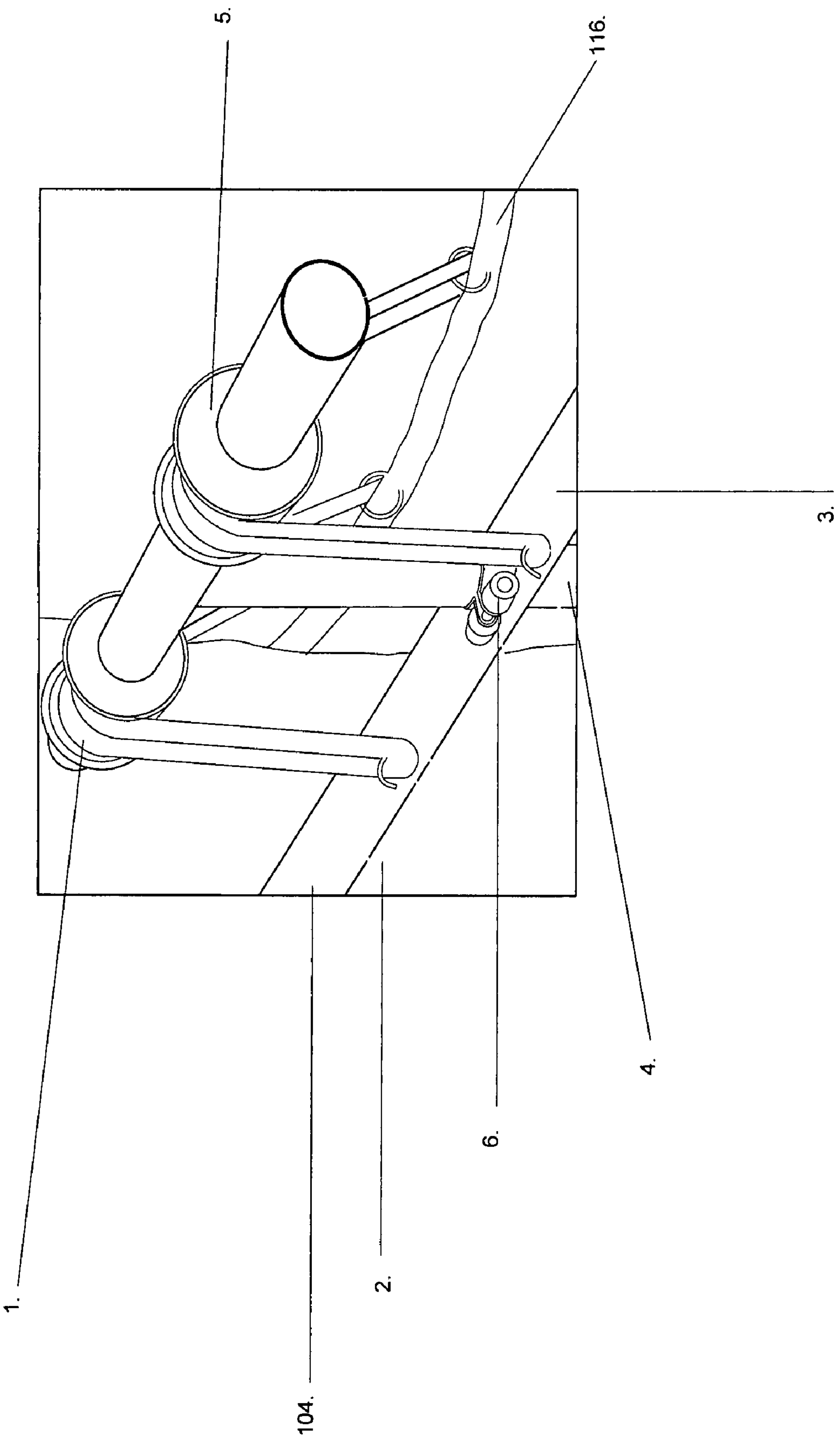
FIG. 3 shows the tee of FIG. 1 with pulleys supporting the upper bend of the elastic, and the height adjusting channel, with securing hardware.

FIG. 3 shows the tee 4 of FIG. 1 with pulleys 5 supporting the upper bend of the elastic 1, and the height adjusting channel 116, with securing hardware 6. Spring means 1 is a loop which is removably attached to the wheeled frame 104 by means of a welded hook 2 attached to cross brace 3. The bends of the loops 1 are supported by a height adjustable tee 4 and move freely on the pulleys 5. Height adjustability is conferred by a slightly oversized channel and cam disconnect 6 which may be squeezed tight by means of a standard cam operated quick disconnect, of the type employed for the seat height adjustment on most bicycles.

The type of spring means 1 used is not critical to the invention provided that it is capable of bearing upper body weight, and of transferring it to the wheeled frame 104, bypassing the leg with the weight. For example, other type spring means 1 may be used such as extension springs, compression springs, elastic straps, etc. Additionally, the number of springs and the pound tension is not critical and may be varied according to the needs of the runner.

Figure 4:
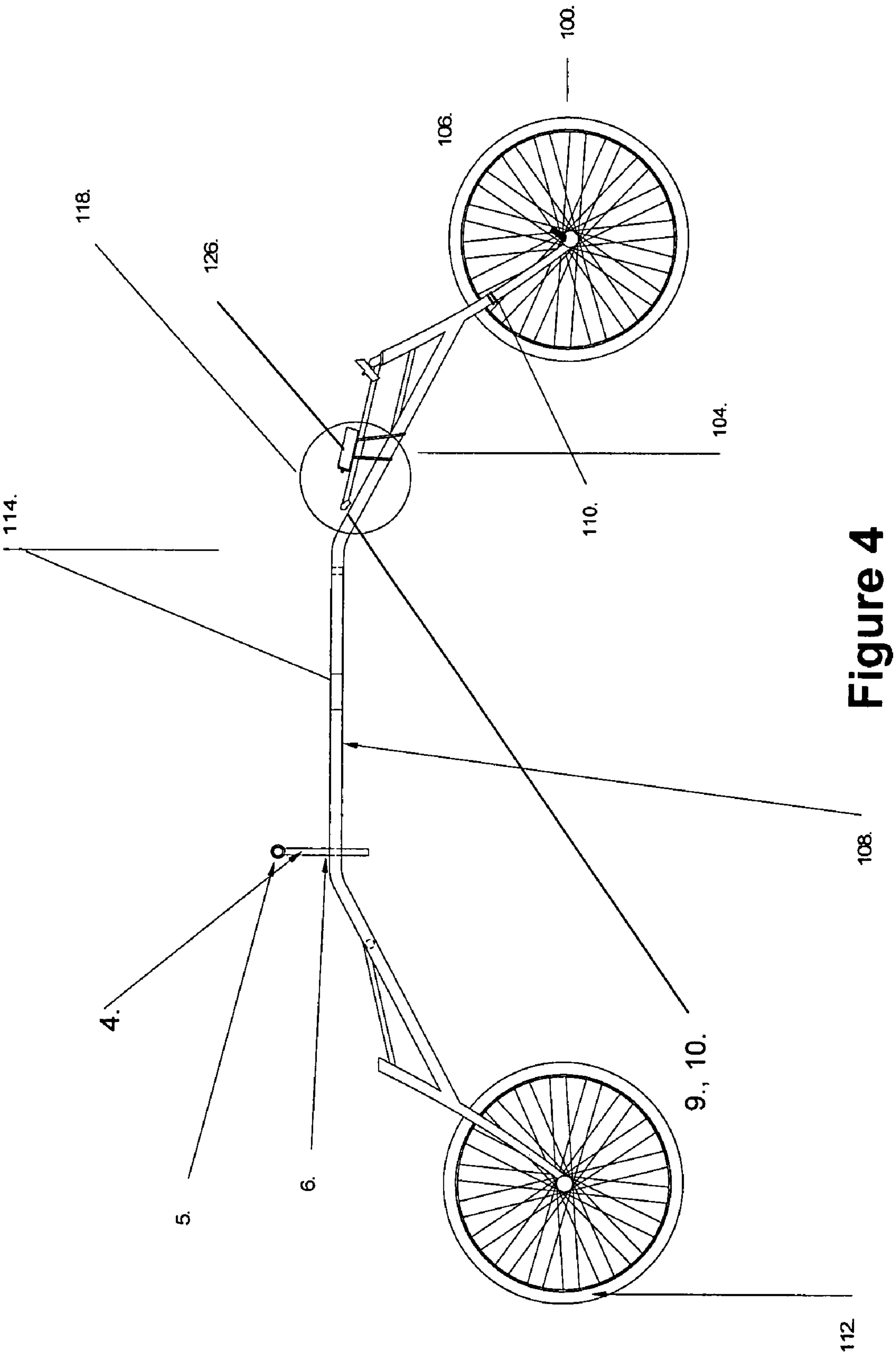
FIG. 4 is a right side elevational view of the wheeled frame of FIG. 1.

FIG. 4 is a right side elevational view of wheeled frame 104. Hands-free steering device 118 is shown in more detail in FIG. 8. Height adjustable tee 4 is best shown FIG. 3. Disconnect 114 is best shown in FIGS. 5A and 5B.

Referring to FIGS. 1-4, the method of using the running device assembly will now be described. In preparation for running the harness 102 is pulled on with thigh straps 66 around the thighs like a pair of shorts, and secured at the waist with the waist strap 67. With the wheeled frame 104 inclined nearly to the ground, the runner steps into the encircling frame 108, and raises it just a little to enable stretching the rubber bands 1 over the pulleys 5, and securing them on the hooks 2. Righting the device tensions the spring means. The bungee 20 is then extended to the front and hooked over the cross brace 3. This centers the runner front to back and left to right within the wheeled frame. When running the rubber springs 1 will stretch in response to varying flexure generating forces in opposition to forces generated by the runner's body weight thereby shifting the upper body weight of the runner from the runner's legs through the spring means 1 to the wheeled frame 104. The shifting of the upper body weight of the runner to the wheeled frame will reduce the strain on the runner's legs and will reduce fatigue caused by such strain.

Figure 5B:
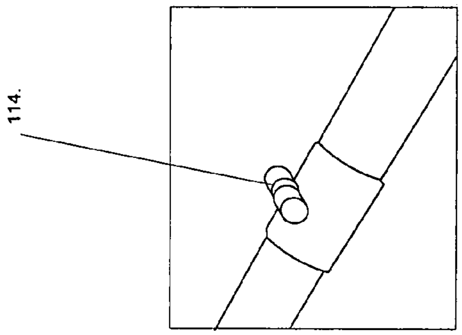
FIGS. 5A and 5B are side perspective views of the front and back halves of the frame separated and connected, respectively.
Figure 5A:
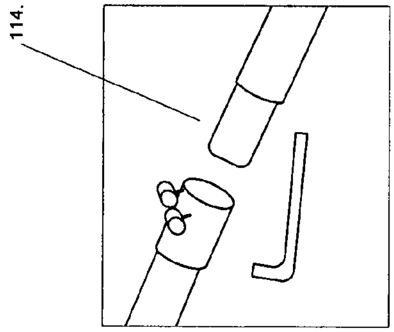

FIGS. 5A and 5B are side perspective views of the front and back halves of frame 104 separated and connected by quick disconnect 114, respectively.

Figure 6:
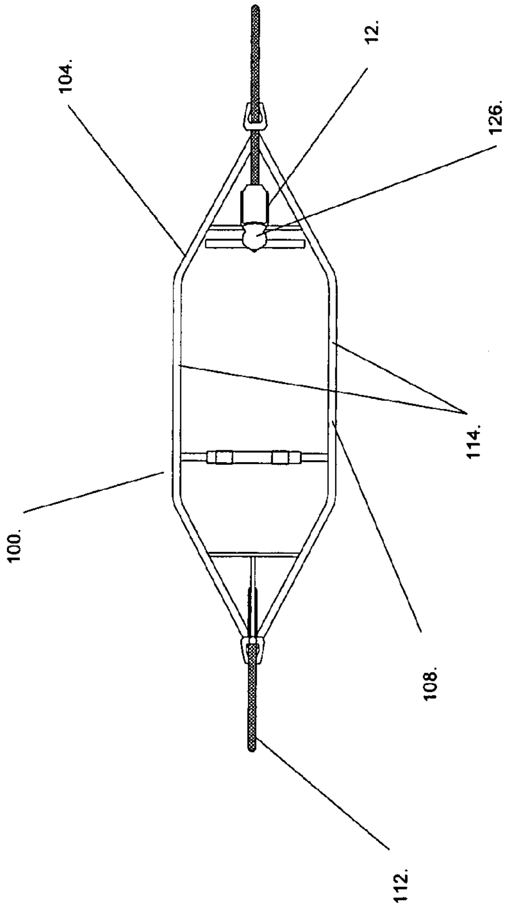
FIG. 6 is a top plan view of the wheeled frame.
Figure 7:
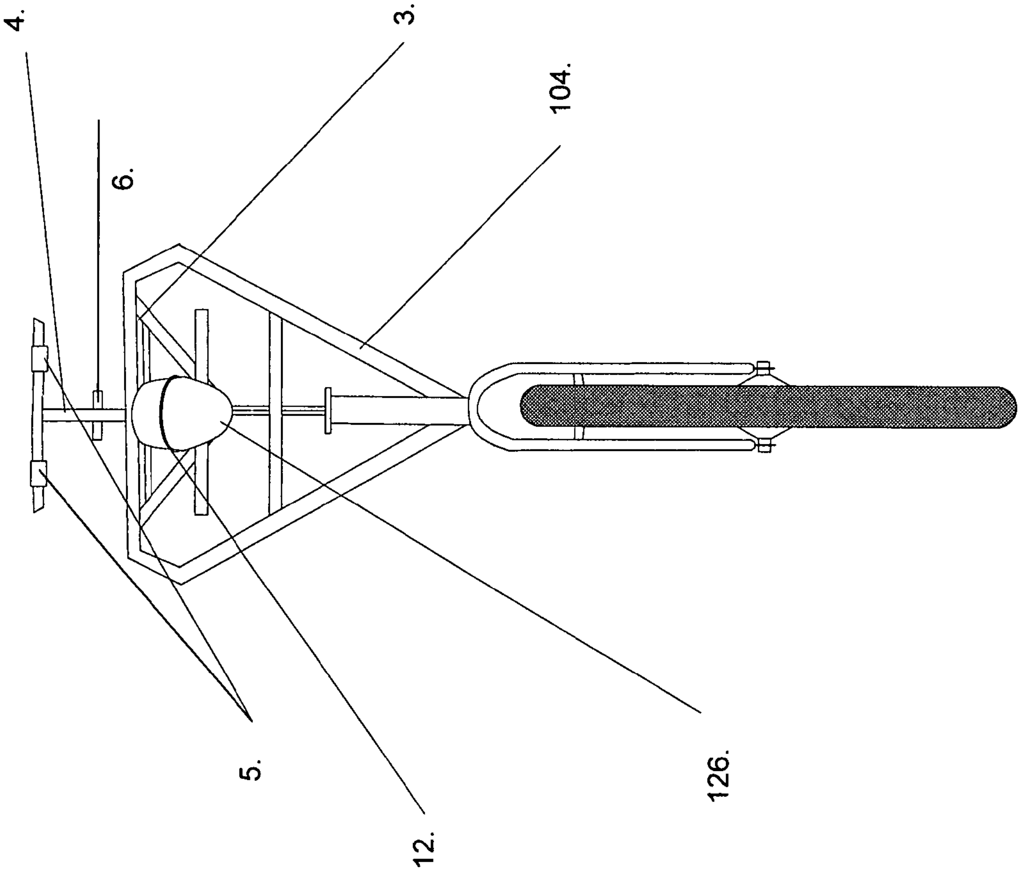
FIG. 7 is a front elevational view of the wheeled frame.

FIG. 6 is a top plan view of wheeled frame 104 of FIG. 1. FIG. 7 is a front elevational view of wheeled frame 104 of FIG. 1.

Figure 8:
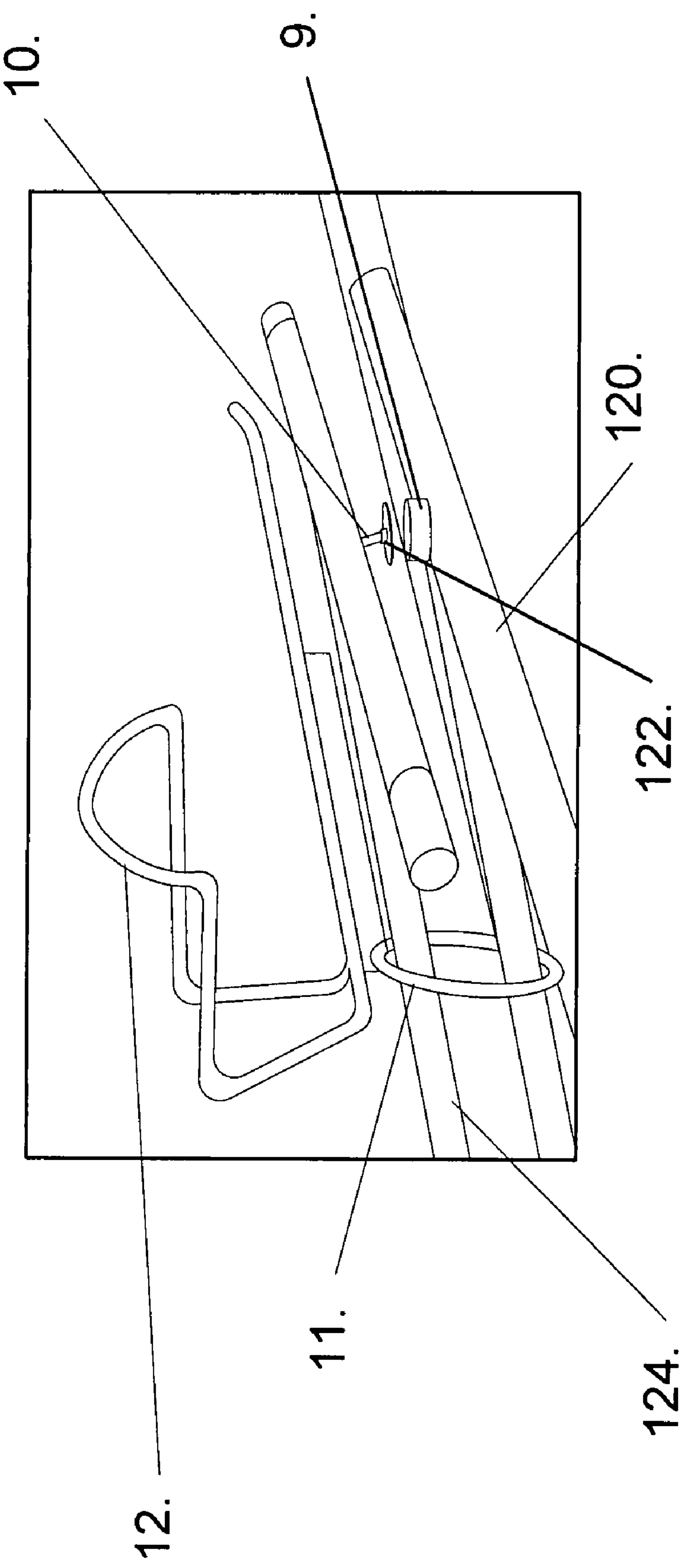
FIG. 8 is a partial front right perspective view of the steering mechanism of the present invention.

FIG. 8 is a partial front right perspective view of the steering mechanism 118 of the present invention. Three modifications to the steering meet the needs of hands free operation 118. To provide adjustable centering to counter the variable effects of wind and side slope, there is a free sliding Neodymium magnet 9 (or other type of magnet) placed upon a cross member 120 beneath a ferrous metal fender washer 122 which may be raised or lowered by means of the screw 10 securing it to the steering stem. A restraining bungee cord 11 encircles the movable handlebar steering stem 124 and the fixed position frame member beneath it to restrain steering swing. A water bottle holder 12 is affixed to contain at least six ounces of water whose activity in motion dampens steering stem and wheel oscillation.

The above-described invention provides a novel and simple device which is easy to use and inexpensive to manufacture. While the preferred embodiments of the invention have been described in detail above, various modifications and variations of the invention are possible in light of the above teachings. It is therefore, to be understood that within the scope of the appended claims the invention may be practiced otherwise than as above described.

What is claimed is:

1. An exercise apparatus for a person comprising:

a) a support frame configuration to define an interior cavity for accommodating the person in standing positions for walking or running on a support surface;

b) an elastic suspension assembly coupled between the person and the frame for elastically supporting a portion of the person's weight upon bending of the person's knees during a walking or running motion;

c) a lost motion coupling device between a handlebar steering stem and frame to accommodate changes in the support surface and wind forces, said coupling including an elastic loop surrounding the handlebar steering stem and frame defining the limits of relative movement therebetween; and d) an adjustable magnetic coupling between the handlebar steering stem and frame.

2. The apparatus of claim 1, further including wheels on a bottom portion of the support frame for rolling on the support surface.

3. The apparatus of claim 2, including at least two wheels.

4. The apparatus of claim 2, further including a handlebar at a front end of the frame for grasping by the person.

5. The apparatus of claim 2, wherein the support surface is a roadway.

6. The apparatus of claim 1, wherein said support frame includes coupling members for attachment to said elastic suspension assembly.

7. The apparatus of claim 6, wherein said elastic suspension assembly includes a harness attachable to the person and springs connecting the harness to the coupling members on the frame.

8. The apparatus of claim 7, wherein the springs are elastic straps.

9. The apparatus of claim 1, further including a water reservoir for damping steering oscillation.

10. A method of reducing stress on a jogger's knees, while performing a normal jogging motion and gait, comprising the steps of:

a) providing an exercise apparatus for the jogger including, i) a support flame configuration to define an interior cavity for accommodating the person in standing positions for walking or running on a support surface;

ii) an elastic suspension assembly coupled between the person and the frame for elastically supporting a portion of the person's weight upon bending of the person's knees during a walking or running motion;

iii) a lost motion coupling device between a handlebar steering stem and frame to accommodate changes in the support surface and wind forces, said coupling including an elastic loop surrounding the handlebar steering stem and frame defining the limits of relative movement therebetween; and iv) an adjustable magnetic coupling between the handlebar steering stem and frame;

b) placing the jogger within the interior cavity of the support flame; and c) connecting the jogger to the suspension assembly.

11. The method of claim 10, further including wheels on a bottom portion of the support frame for rolling on the support surface.

12. The method of claim 11, further including a handlebar at a front end of the frame for grasping by the person.

13. The method of claim 11, wherein the support surface is a roadway.

14. The method of claim 10, including at least two wheels.

15. The method of claim 10, wherein said support frame includes coupling members for attachment to said elastic suspension assembly.

16. The method of claim 15, wherein said elastic suspension assembly includes a harness attachable to the person and springs connecting the harness to the coupling members on the frame.

17. The method of claim 16, wherein the springs are elastic straps.

* * * * *